United States Patent
van Welzen et al.

(10) Patent No.: US 12,430,913 B2
(45) Date of Patent: *Sep. 30, 2025

(54) EVENT INFORMATION EXTRACTION FROM GAME LOGS USING NATURAL LANGUAGE PROCESSING

(71) Applicant: NVIDIA Corporation, Santa Clara, CA (US)

(72) Inventors: James Lewis van Welzen, Sandy, UT (US); Prakash Yadav, Maharashtra (IN); Charu Kalani, Bothell, WA (US); Jonathan White, Fort Collins, CO (US); Shyam Raikar, Maharashtra (IN); Stephen Holmes, Fort Collins, CO (US); David Wilson, Liberty Hill, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,979

(22) Filed: Jun. 11, 2024

(65) Prior Publication Data

US 2024/0331382 A1 Oct. 3, 2024

Related U.S. Application Data

(63) Continuation of application No. 17/468,468, filed on Sep. 7, 2021, now Pat. No. 12,014,547.

(51) Int. Cl.
*G06F 40/279* (2020.01)
*A63F 13/45* (2014.01)
(Continued)

(52) U.S. Cl.
CPC .............. *G06V 20/46* (2022.01); *A63F 13/45* (2014.09); *A63F 13/53* (2014.09);
(Continued)

(58) Field of Classification Search
USPC ........................................................ 386/241
See application file for complete search history.

(56) References Cited

U.S. PATENT DOCUMENTS 9,589,578 B1  3/2017  Dippenaar
10,691,473 B2  6/2020  Karashchuk et al.
(Continued)

OTHER PUBLICATIONS

Van Welzen, et al.; Non-Final Office Action for U.S. Appl. No. 17/468,468, filed Sep. 7, 2021, mailed Jul. 6, 2023, 21 pgs.
(Continued)

*Primary Examiner* — Nigar Chowdhury
(74) *Attorney, Agent, or Firm* — Taylor Duma L.L.P.

(57) ABSTRACT

In various examples, natural language processing may be performed on text generated by a game to extract one or more in-game events from the game. The system (e.g., a client device and/or server) may receive the text in the form of one or more strings generated by a game application. The system may then extract one or more in-game events from the text using natural language processing. The game may include the text in a message it sends to the system (e.g., using an Application Programming Interface (API)) and/or in a game log entry or notification. The text may be generated based at least on the game determining one or more conditions are satisfied in the gameplay (e.g., victory, points scored, milestones, eliminations, item acquisition, etc.). The text may be mapped to event templates, which may then be used to extract parameters of events therefrom.

20 Claims, 10 Drawing Sheets

(51) Int. Cl.
*A63F 13/53* (2014.01)
*G06F 16/783* (2019.01)
*G06V 20/40* (2022.01)

(52) U.S. Cl.
CPC ........ *G06F 16/7844* (2019.01); *G06F 40/279* (2020.01); *G06V 20/44* (2022.01)

(56) References Cited

U.S. PATENT DOCUMENTS

| | | |
|---|---|---|
| 10,798,037 B1 | 10/2020 | Vadayadiyil Raveendran et al. |
| 10,835,828 B1 | 11/2020 | Pather et al. |
| 10,864,447 B1 | 12/2020 | Willette et al. |
| 10,922,357 B1 | 2/2021 | Chennuru et al. |
| 12,014,547 B2 | 6/2024 | van Welzen et al. |
| 2006/0040718 A1 | 2/2006 | Davis |
| 2008/0146342 A1 | 6/2008 | Harvey et al. |
| 2013/0275164 A1 | 10/2013 | Gruber et al. |
| 2015/0005073 A1 | 1/2015 | Cudak et al. |
| 2015/0194146 A1 | 7/2015 | Wu et al. |
| 2016/0271493 A1 | 9/2016 | Perlman |
| 2017/0001122 A1 | 1/2017 | Leung et al. |
| 2017/0003740 A1 | 1/2017 | Verfaillie et al. |
| 2017/0003784 A1* | 1/2017 | Garg .............. A63F 13/87 |
| 2017/0006074 A1* | 1/2017 | Oates, III .......... H04N 21/2353 |
| 2017/0065889 A1 | 3/2017 | Cheng |
| 2018/0268775 A1 | 9/2018 | Horneff et al. |
| 2018/0285170 A1 | 10/2018 | Gamon et al. |
| 2019/0034976 A1* | 1/2019 | Hamedi ............. G06Q 30/0243 |
| 2019/0082713 A1* | 3/2019 | Little ................ A23G 1/50 |
| 2019/0091545 A1* | 3/2019 | Genova ............... H04W 12/33 |
| 2019/0205645 A1 | 7/2019 | Bates et al. |
| 2020/0016495 A1 | 1/2020 | Cruz et al. |
| 2020/0147496 A1 | 5/2020 | Mahlmeister et al. |
| 2020/0210053 A1 | 7/2020 | Baunach et al. |
| 2020/0349229 A1 | 11/2020 | Abudalfa et al. |
| 2020/0384396 A1 | 12/2020 | Oh et al. |
| 2021/0295836 A1 | 9/2021 | Iwase et al. |
| 2022/0189173 A1 | 6/2022 | Zhou et al. |
| 2022/0309279 A1 | 9/2022 | Blswas et al. |
| 2022/0374635 A1 | 11/2022 | Xiong et al. |
| 2023/0071358 A1 | 3/2023 | van Welzen et al. |

OTHER PUBLICATIONS

Van Welzen, et al.; First Office Action for German Patent Application No. 10 2022 121 508.3, filed Aug. 25, 2022, mailed Jul. 13, 2023, 16 pgs.

Van Welzen, James Lewis; Notice of Allowance for U.S. Appl. No. 17/468,468, filed Sep. 7, 2021, mailed Feb. 14, 2024, 13 pgs.

* cited by examiner

600

RECEIVE AT LEAST ONE MESSAGE COMPRISING AT LEAST ONE STRING OF TEXT GENERATED BY A GAME BASED AT LEAST ON ONE OR MORE CONDITIONS BEING SATISFIED IN A GAME SESSION
B602

↓

MAP THE AT LEAST ONE STRING OF TEXT TO AN EVENT TEMPLATE
B604

↓

EXTRACT ONE OR MORE PARAMETERS FROM THE STRING OF TEXT USING THE EVENT TEMPLATE
B606

↓

TRANSMIT DATA THAT CAUSES A DISPLAY IN A USER INTERFACE THAT IS BASED AT LEAST ON THE ONE OR MORE PARAMETERS OF THE EVENT
B608

FIGURE 6

EVENT INFORMATION EXTRACTION FROM GAME LOGS USING NATURAL LANGUAGE PROCESSING

CROSS-REFERENCE TO RELATED APPLICATIONS

This application is a continuation of U.S. patent application Ser. No. 17/468,468, filed Sep. 7, 2021, which is hereby incorporated by reference in its entirety.

BACKGROUND

In various scenarios, it may be desirable for software outside of a game application to identify in-game events, examples of which may include an outcome of a game instance, a score, or a start or end to a match. For example, software applications external to the game application may use in-game events as inputs to various pipelines, such as to identify and present highlights in the form of screenshots and/or video clips, to generate posts to activity or social feeds, and/or to generate summaries of gameplay sessions.

Conventionally, game developers may incorporate Application Programming Interfaces (APIs) into game code (i.e., programmed instructions) of a game application that communicates in-game events to external software. This requires that the game code conform to the API's representation of in-game events, which are typically represented in in varying, highly inconsistent manners between different games or game developers. Thus, the external software may receive in-game events from games that are incorrectly or inconsistently mapped to the API's representation, which may result in erroneous output from the pipelines that consume these in-game events. As such, game developers are often reluctant to incorporate these APIs into game code.

In other approaches, the external software may analyze frames of gameplay using various computer vision techniques—such as optical character recognition (OCR) or object detection—to extract in-game events. However, analyzing frames of gameplay imposes a significant computational burden. For example, since frames of video data are often transmitted at a high rate of speed, the computational burden may prevent real-time extraction of in-game events. Additionally, game developers often update or modify the appearance or layout of games, which may cause some in-game events to be missed or to be identified as false positives.

SUMMARY

Embodiments of the present disclosure relate to event information extraction from game logs using Natural Language Processing (NLP). The disclosure provide approaches for using NLP to detect occurrences of in-game events using natural language strings generated by a game application.

In contrast to conventional approaches, the present disclosure provides solutions for leveraging natural language processing of text generated by a game to extract one or more in-game events from the game. In one or more embodiments, the system (e.g., a client device and/or server) may receive the text in the form of one or more strings generated by a game application. The system may then extract one or more in-game events from the text using natural language processing. In at least one embodiment, the game may include the text in a message sent to the system (e.g., using an Application Programming Interface (API)) and/or in a game log entry or notification. The text may be generated (and provided to the system) based at least on (e.g., in response to) the game determining one or more conditions are satisfied in the gameplay (e.g., victory, points scored, milestones, eliminations, item acquisition, etc.).

The system may use NLP to extract one or more events that conform to an API of the system's representation of in-game events. In one or more embodiments, the system may use the NLP to determine one or more parameters of an event that corresponds to gameplay of a game. For example, parameters may represent one or more aspects of gameplay, such as an event type (e.g., session, match, round, etc.), event entities (e.g., player names, non-player characters, bosses, etc.), event results (e.g., win, lose, etc.), and/or event objects (e.g., items, weapons, etc.). In one or more embodiments, the system may identify one or more action words (e.g., started, ended), session identifier words (e.g., session, match, round), and/or connector words (e.g., named, to) to map the words to one or more event templates that correspond to one or more events. For example, the system may map one or more portions of the text to an event template, then perform further analysis to extract one or more parameters of the template therefrom. An event template may be specific to a particular application, game, version of a game, or genre of game. In some examples, templates may be retrieved or updated using a configuration file. Further, the system may use an identifier of the game (e.g., received in the message) to determine a set of event templates associated with the game for use in extracting in-game events.

BRIEF DESCRIPTION OF THE DRAWINGS

The present systems and methods for event information extraction from game logs using Natural Language Processing (NLP) are described in detail below with reference to the attached drawing figures, wherein:

FIG. 6 is a flow diagram showing an example method for determining an event from at least one string of text using an event template, in accordance with at least some embodiments of the present disclosure;

DETAILED DESCRIPTION

Figure 1:
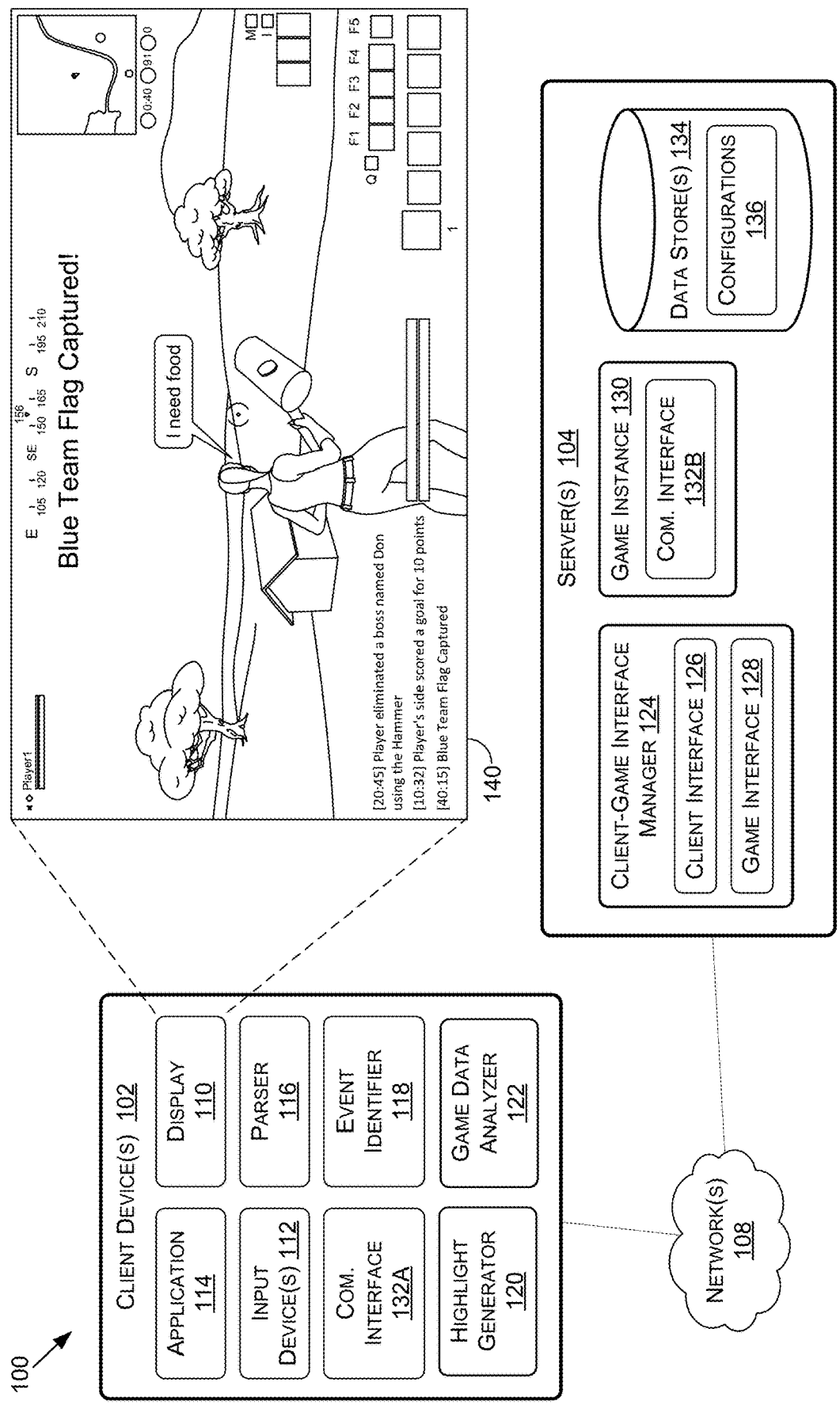
FIG. 1 is an example system diagram of an NLP event extraction system, in accordance with at least some embodiments of the present disclosure.

Systems and methods are disclosed related to applying Natural Language Processing (NLP) techniques to game logging information for event extraction. The disclosure provides approaches for using NLP techniques to detect occurrences of in-game events using natural language strings generated by a game application.

In one or more embodiments, the system (e.g., a client device and/or server) may receive text in the form of one or more strings generated by a game application. The system may then extract one or more in-game events from the text using natural language processing. As such, the game code need not generate in-game events using an Application Programming Interface's (API's) representation of in-game events and there is no requirement to analyze frames of gameplay to identify in-game events.

In some examples, the system may receive the text in natural language form and/or the text may be generated by a game application as part of normal operations of the game. For example, the text may be from one or more log entries and/or player notifications generated by the game as the game identifies in-game events according to its internal representations. In various examples, the text may include variable names, values and/or other text corresponding to an internal representation of game state. The game may generate a message sent to the system and/or a game log entry or notification used by the system when the game determines one or more conditions are satisfied in the gameplay (e.g., victory, points scored, milestones, eliminations, item acquisition, etc.). For example, a game may generate a message, log entry, and/or notification when a player of the game wins a match, scores points, or when any of a number of actions, interactions, or combinations thereof occur during gameplay. In some examples, the notification may be displayed to one or more players in the game during gameplay (e.g., upon corresponding conditions being satisfied).

The system may receive one or more portions of the text during and/or after gameplay that corresponds to the text. Further, one or more portions of the text may be received in one or more messages as the one or more portions are generated (e.g., as the game generates a log entry or player notification or in response to such generation), may be received in batches, and/or may all be received after a corresponding gameplay session(s) has completed (e.g., in a game log file). Where one or more messages are used to send the text, the game may provide a message(s) to the system using an API call(s). The API(s) call may include a string of text comprising the one or more portions of the text, a game, program and/or process identifier associated with the game, and/or one or more timestamps that correspond to the one or more portions of the text (e.g., to when the internal in-game event occurred). Additionally or alternatively, one or more portions of the text may be provided by the game as a log file, record, or other data structure.

The system may use NLP techniques to extract one or more events that conform to the API's representation of in-game events (which may be based at least on the game and/or a game type). In one or more embodiments, the system may use a neural network or other learning machine trained or otherwise programmed to perform NLP to process a text representation of a game or application event and determine one or more parameters of the event that corresponds to gameplay of a game. For example, parameters may represent one or more aspects of gameplay, such as an event type (e.g., session, match, round, etc.), event entities (e.g., player names, non-player characters, bosses, etc.), event results (e.g., win, lose, etc.), and/or event objects (e.g., items, weapons, etc.). In one or more embodiments, the system may identify one or more action words (e.g., started, ended), session identifier words (e.g., session, match, round), and/or connector words (e.g., named, to) to map the words to one or more event templates that correspond to one or more events. An event template may define one or more parameters of the one or more events that correspond to the event template. For example, the system may map one or more portions of the text to an event template, then perform further analysis to extract one or more parameters of the template therefrom. As examples, an event template may be specific to a particular application, game, version of a game, or genre or type of game. In some examples, templates may be retrieved or updated using a configuration file. Further, the system may use an identifier of the game (e.g., received in the message(s)) to determine a set of event templates associated with the game for use in extracting in-game events.

The events identified by the system may be used for various pipelines and process. In one or more embodiments, data may be transmitted to cause generation of one or more highlights of one or more game sessions based at least on one or more identified events and/or parameters thereof. A highlight may include any representation of one or more game sessions, including a snapshot or screenshot of gameplay, an activity or social feed post, and/or a video clip of a portion of one or more game sessions—such as of a specific action or event within gameplay. Highlight generation may be performed on the system, a client device(s), and/or a server. In some examples, a highlight may be generated for a single event, while in other examples a highlight may correspond to multiple events.

While the disclosure is primarily described in terms of games generating the text used to identify events, disclosed concepts are more widely applicable to other types of software and applications generating the text used to identify events. In such examples, an application may generate the text based at least on one or more conditions being satisfied in an application session. Disclosed approaches may be implemented in a variety of possible systems including, but not limited to, a control system for an autonomous or semi-autonomous machine, a perception system for an autonomous or semi-autonomous machine, a system for performing simulation operations, a system for performing deep learning operations, a system implemented using an edge device, a system implemented using a robot, a system incorporating one or more virtual machines (VMs), a system implemented at least partially in a data center, or a system implemented at least partially using cloud computing resources.

With reference to FIG. 1, FIG. 1 is an example system diagram of an NLP event extraction system 100 (also referred to as "system 100"), in accordance with at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, among other things, one or more client devices 102, one or more servers 104, and one or more networks 108. Although one client device 102 is illustrated in FIG. 1, this is not intended to be limiting. In examples, there may be any number of client devices 102. The system 100 (and the components and/or features thereof) may be implemented using one or more computing devices, such as the computing device 900 of FIG. 9, described in more detail below.

The client device(s) 102 may include an application 114, a communication interface 132A, an input device(s) 112, a parser 116, an event identifier 118, a highlight generator 120, a game data analyzer 122, and/or a display 110. Although only a few components and/or features of the client device(s) 102 are illustrated in FIG. 1, this is not intended to be limiting. For example, the client device(s) 102 may comprise additional or alternative components, such as those described below with respect to the computing device 900 of FIG. 9.

The server(s) 104 may include, among other things, a client-game interface manager 124, a game instance 130 (or game 130), and/or a data store(s) 134. Although only a few components and/or features of the server(s) 104 are illustrated in FIG. 1, this is not intended to be limiting. For example, the server(s) 104 may comprise additional or alternative components, such as those described below with respect to the computing device 900 of FIG. 9.

As an overview, the client-game interface manager 124 of the server 104 may include a client interface 126 and/or a game interface 128. The client interface 126 and the game interface 128 may be configured to manage communications via any number of network(s) 108, described herein. For example, the client-game interface manager 124 may use the client interface 126 to communicate with the application 114 of the client device(s) 102 and/or the game interface 128 to communicate with the game instance 130 of the server(s) 104.

Figure 3:
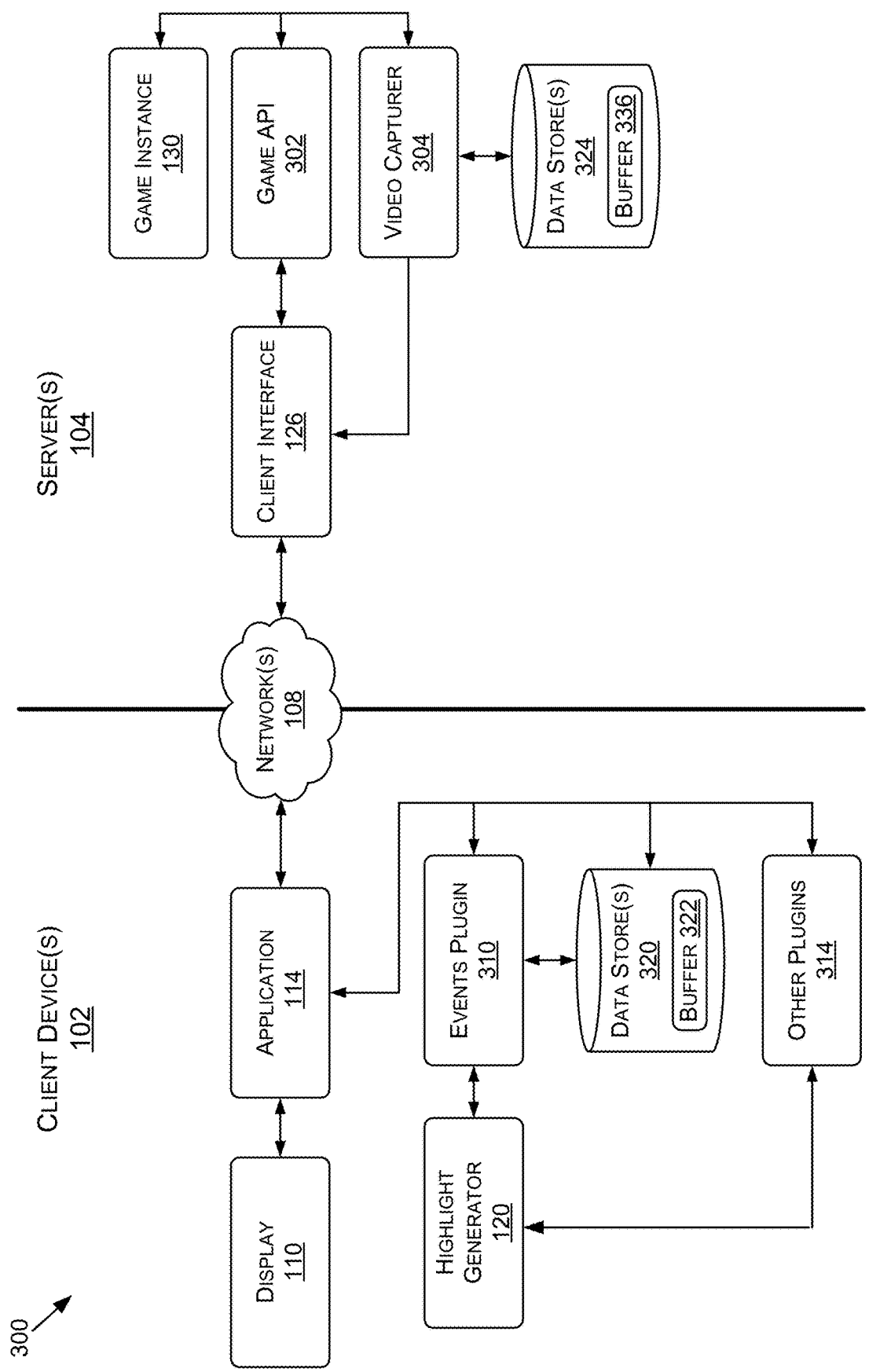
FIG. 3 is an example system diagram of a highlight generation system, in accordance with at least some embodiments of the present disclosure.

In some examples, the game interface 128 may include an interface such as the game API 302 of FIG. 3, which may be configured to receive API calls from the game instance 130. In some examples, the game interface 128 may include the video capturer 304 of FIG. 3, which may be configured to capture video data associated with game play from the game instance 130. In some examples, the client device(s) 102 may use an Ethernet or Wi-Fi connection through a router to access the Internet in order to communicate with the server(s) 104 through the client-game interface manager 124.

The parser 116 may include one or more components and features for processing at least one string of text from one or more messages and/or other data sources. In some examples, the text may be in natural language form. The parser 116 may receive the text (e.g., from the communication interface 132A), which may have been generated by the game instance 130 and/or the application 114 (e.g., in association with gameplay which may correspond to a frame(s) 140). The parser 116 may parse the text into one or more sub-strings and may provide the parsed sub-strings to the event identifier 118.

The parser 116 may use one or more configuration files to process one or more strings of text. For example, a configuration file may be used in association with a particular game or genre or type of game. The configuration file may indicate to the parser 116, a manner in which strings of text from a game should be parsed.

The event identifier 118 may include one or more components and features for processing strings of text provided by the parser 116 (e.g., one or more sub-strings of the text). The event identifier 118 may map a string(s) of text (e.g., provided by the parser 116) to an event template that may define one or more parameters of an event corresponding to gameplay of a game. For example, the event identifier 118 may use an event template retrieved from the server(s) 104 to define parameters that reflect an aspect of gameplay associated with the game instance 130.

The game data analyzer 122 may include one or more components for analyzing gameplay data. For example, the game data analyzer 122 may receive gameplay data that has been extracted by the parser 116 and the event identifier 118. The game data analyzer 122 may determine that particular game events have occurred in a game session and may collect and/or generate additional data associated with that game event. For example, the game data analyzer 122 may determine, based at least on parameters extracted from a string of text by the event identifier 118, that one or more significant gameplay events occurred and that a highlight should be generated for that event(s). A significant gameplay event may be selected based at least on one or more criteria, such as additional information associated with a game session and/or an event. In some examples, the game data analyzer 122 may receive and/or analyze the additional information, such as frames of video data or timestamps corresponding gameplay of a game. In some examples, the additional information may include player information, game statistic information, and/or any of a number of other data items. The game data analyzer 122 may provide data indicating the selected game events to the highlight generator 120.

The highlight generator 120 may include one or more components for generating game highlights. The highlight generator 120 may receive data from the game data analyzer 122 that indicates that a significant gameplay event has occurred. In some examples, the highlight generator 120 may generate game recordings, replays, graphical elements, overlays to video data, and/or other highlights elements such as shown in the graphical user interface 400 of FIG. 4. The graphical user interface 400 may include controls for capturing clips of the game stream, filtering generated highlights, searching for generated highlights, determining a runtime status of highlights, and/or a gallery selection of highlights.

Components of the system 100 may communicate over a network(s) 108. The network(s) 108 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 108.

The client device(s) 102 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant (e.g., an AMAZON ECHO, a GOOGLE HOME, etc.), and/or another type of device capable of supporting streaming of video and/or audio.

An application 114 may be a mobile application, a computer application, a console application, a web browser application, a video streaming platform application, and/or another type of application or service. In some embodiments, multiple applications 114 may be employed. In one or more embodiments, an application 114 may include instructions that, when executed by a processor(s), cause the processor(s) to, without limitation, receive input data representative of user inputs to the one or more input device(s) 112, transmit the input data to the server(s) 104, in response receive a video stream from the client-game interface manager 124 using the communication interface 132A, and cause display of the video on the display 110. In other words, the application 114 may operate as a facilitator for enabling streaming of video, which may include the frame(s) 140 of gameplay or other content associated with the application on the client device(s) 102.

In one or more embodiments, the client device(s) 102 may use the application 114 to display the gameplay video or other video content on the display 110. In examples where the display data is received by the client device(s) 102, the system 100 may be part of a game streaming system, such as the content streaming system 800 of FIG. 8, described in more detail below.

The display 110 may include any type of display capable of displaying the video (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 110 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen includes at least one of the input device(s) 112 of the client device(s) 102.

The input device(s) 112 may include any type of devices that are capable of providing user inputs to the game. The input device(s) may include a keyboard, a mouse, a touch-screen display, a controller(s), a remote(s), a headset (e.g., sensors of a virtual reality headset), and/or other types of input devices.

The communication interfaces such as the communication interface 132A and the communication interface 132B (referred to collectively or individually herein as "communication interface(s) 132") may include one or more components and features for communicating across one or more networks, such as the network(s) 108. The communication interface(s) 132 may be configured to communicate via any number of the network(s) 108, described herein. For example, to communicate in the system 100 of FIG. 1, the client device(s) 102 may use an Ethernet or Wi-Fi connection through a router to access the Internet in order to communicate with the server(s) 104, and/or with other client device(s) 102.

Figure 2:
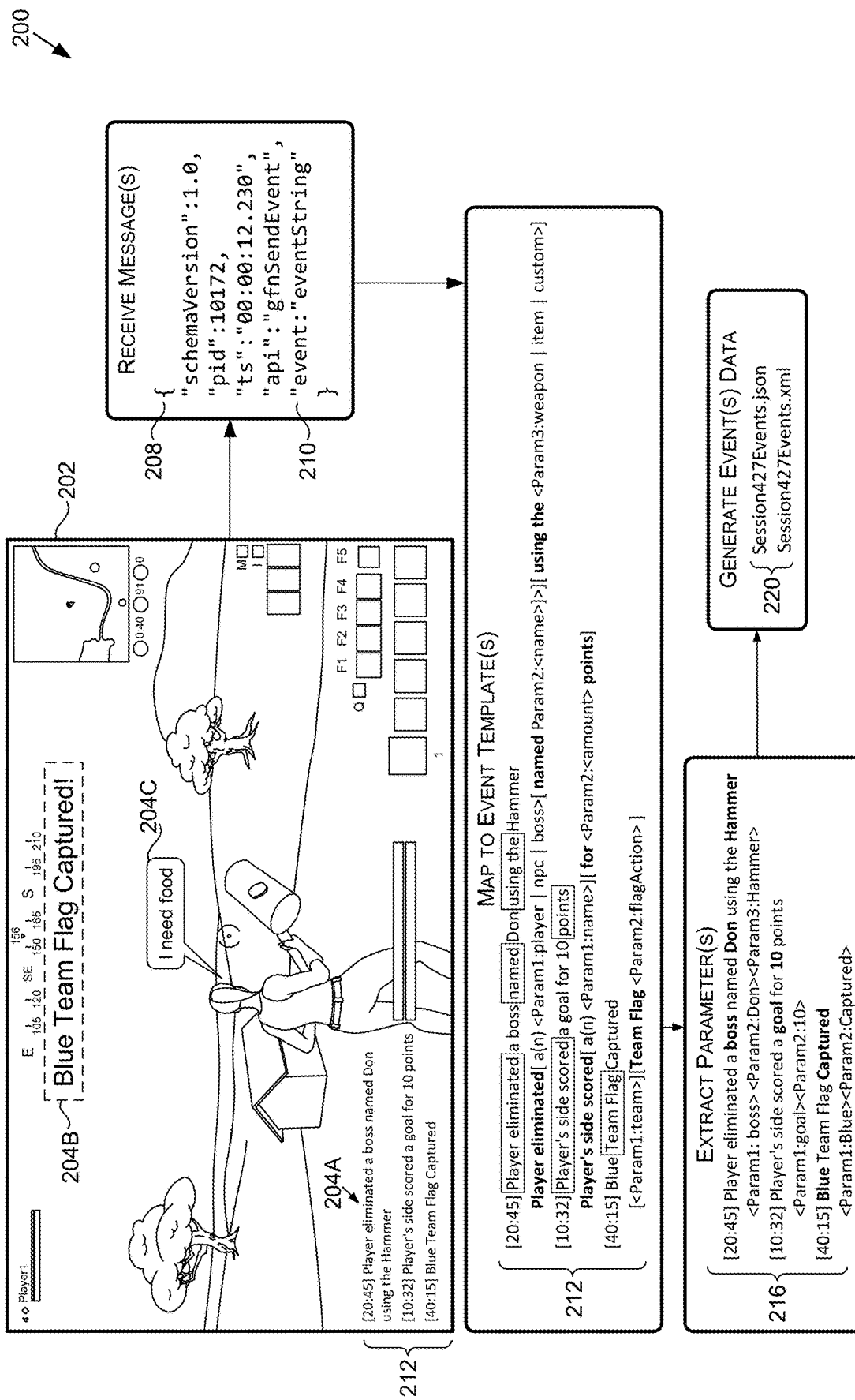
FIG. 2 is a flow diagram showing an event identification process, in accordance with at least some embodiments of the present disclosure.

Now referring to FIG. 2, FIG. 2 is a flow diagram showing an event identification process 200, in accordance with at least some embodiments of the present disclosure. The event identification process 200 may be implemented on the system 100 of FIG. 1. For example, the event identifier 118 may use the process 200 to identify one or more events. The event identification process 200 may be associated with one or more frames 202 of gameplay data, which may correspond to the frame(s) 140 of FIG. 1. The frame(s) 202 may include a display or presentation of one or more text elements, such as a text element 204A, a text element 204B, and a text element 204C. The text elements may include the text analyzed by the event identifier 118 using the parser 116 to detect events and may be displayed or presented in textual form, as shown, or using different representations. For example, one or more text elements may be displayed in a GUI and/or frame generated by the game instance 130 (as shown). However, one or more text elements may additionally or alternatively be included in one or more additional GUIs, files, or data structures, such as a log file related to the gameplay (e.g., generated by the game instance 130), without necessarily being displayed or represented in-game. Text elements may include any text information generated by or using a game instance. For example text elements may include natural language strings, sentences, numerals, timestamps, variable names, values and/or other text corresponding to an internal representation of game state, etc.

Text information corresponding to one or more of the text elements may be transmitted in one or more messages 208 (e.g., from the communication interface 132B of the game instance 130 to the communication interface 132A of the client device 102). A message 208 may contain text information and any of a number of other parameters, fields, or values. For example, a message 208 may include a parameter or field named "event" associated with a text element and expressed as a natural language string(s) 210, as shown. Although the string 210 is in natural language form, in other examples, the string may not be in natural language form. FIG. 2 also shows an "api" field which may include an identifier of the API associated with the message 208, a "ts" field which may include a timestamp(s) of the message 208 and/or the string(s) 210, a "pid" field which may include a game, program and/or process identifier associated with the game instance 130.

The natural language string 210 may be transmitted as part of the one or more messages 208 to a component configured to map one or more parts of the natural language string 210 to one or more event templates. For example, the one or more messages 208 may be received by the client device 102 and mapped to an event template by the event identifier 118 using the parser 116. The natural language string 210 may include at least a portion of game text 212, presented and/or generated by the game instance 130 during the gameplay of a game (e.g., one or more timestamped strings of text). One or more portions of the game text 212 may correspond to one or more conditions being satisfied in a game session. For example, the game text 212 includes the text "[20:25] Player eliminated a boss named Don using the Hammer," which may be descriptive of the one or more conditions (e.g., player eliminated, by a boss, etc.). In one or more embodiments, the conditions may be evaluated by game code and relate to gameplay and/or in-game events (e.g., victory, points scored, milestones, eliminations, item acquisition, etc.). For example, the game instance 130 may generate a message, log entry (e.g., corresponding to the text element 204A), and/or notification (e.g., corresponding to the text element 204B or the text element 204C) when a player of the game wins a match, scores points, or when any of a number of actions, interactions, or combinations thereof occur during gameplay. In some examples, the notification may be displayed to one or more players in the game during gameplay (e.g., upon corresponding conditions being satisfied).

The event identifier 118 may use the parser 116 to map the game text 212 to one or more event templates. In one or more embodiments, the game text 212 is mapped to an event template based at least on matching particular words or phrases associated with an event template to the game text 212. In some examples, the game text 212 may be mapped to a template using natural language processing such as named entity recognition ("NER"), regular expression analysis, or any of a number of other NLP techniques. An event template may be associated with a particular game, a particular version of a game, a series of games, or a genre or type of games. In some examples, a generic or base event template may be used for all games if a more specific template is not available for a particular game or is otherwise not suitable for use. An event template may be located on one or more client device(s) 102 or may be located on the data store(s) 134 with associated configurations 136 (e.g., corresponding to configurations files described herein) and retrieved through the network(s) 108. In one or more embodiments, a value of the "pid" field may be used to determine which event template(s) are available for mapping the game text 212 associated with the string 210.

The event identifier 118 may use the parser 116 with an event template to analyze the game text 212 received in the message(s) 208. For example, the parser 116 may select and use an event template comprising or associated with the indicators "Player eliminated," "named," and "using the" to parse the game text 212. By way of example and not limitation, the event template may take the form "Player was eliminated [by a (n)<Param1:<player|npc|boss> [named Param2:<name>]>]][with a (n)<Param3:weapon|item|custom>]." As can be seen, the event template includes data that indicates various terms or phrases used to map text to the event template, as well as parameter fields and data that indicates or identifies potential values for those parameter fields. As another example, the parser 116 may match the phrases "Player's side scored" and "points" from the game text 212 to an event template having those same or similar phrases (or data that otherwise indicates or identifies those terms or phrases). Here the event template may take the form "Player's side scored [a (n)<Param1:name>][for <Param2: <amount> points]". However, event templates described herein may take a variety of potential forms. In one or more embodiments, more than one event template may be mapped to a same string or portion of the game text 212. In one or more embodiments, each event template may correspond to one or more events.

As indicated above, the event template(s) may include or indicate one or more parameter fields and/or values thereof associated with a potential event. For example, the text, "Player eliminated a boss named Don using the Hammer," of the game text 212 may be mapped to an event template having the parameter fields: Param1, Param2, and Param3. The event identifier 118 may use the parser 116 to extract values 216 of parameter fields from the game text 212 using the corresponding event template. As an example, the parser 116 may determine that Param1 of the event template can be mapped to the descriptor, "boss," Param2 can be mapped to the name "Don," and that Param3 can be mapped to the item, "Hammer." As another example, the text, "Blue Team Flag Captured," of the game text 212 may be mapped to an event template comprising, Param1 and Param2. The event template may be selected based at least on the event identifier 118 matching the phrase "Team Flag" to the event template. Using the event template, Param1 may be mapped to team signifier "Blue," while Param2 may be mapped to the flag action, "Captured."

In one or more embodiments, the event identifier 118 may attempt to map one or more of the parameter fields of an event template to the text based at least on at least some of the text being mapped to the event template (e.g., using the indicators). Also, as with the indicators, the values of the parameter fields need not be explicit in or exactly match the definition of an event template, allowing for a wider variety of terms, phrases, values, and sentence structures to be mapped to corresponding events. In one or more embodiments, event templates may identify categories or types of terms, phrases, values, and sentence structures used for mapping, such as and without limitation parts of speech identifiers. Also in one or more embodiments, text in an event template may be mapped to the game text 212 based at least on determining the game text 212 includes one or more synonyms or variations to the text rather than exact matching.

In one or more embodiments, the event identifier 118 may identify an event based at least on mapping a string(s) of text to an event template(s) associated with the event. In one or more embodiment, in order for an event template to be used to identify an event, it must both be mapped to one or more strings of the game text 212, and have at least one of (e.g., all) of its parameter fields mapped to the one or more strings. For example, "Player eliminated a boss named Don using the Hammer," may be mapped to an event template. If the event identifier 108 determines it is unable to map one or more of the parameter fields of the event template to the text (e.g., Param1), the event identifier 108 may not use the event template to identify a corresponding event. In other examples, one or more event templates may allow for partial element mappings, optional element mappings, and/or variations on element mappings.

In one or more embodiments, each event template may correspond to one or more events or portions thereof. For example, if the event identifier 118 is able to successfully map "Player eliminated a boss named Don using the Hammer," to the event template (e.g., including the parameter fields), the event identifier 118 may identify an event corresponding to the event template. Additionally or alternatively, one or more events may correspond to and/or be identified using multiple event templates. For example, the event identifier 118 may identify an event based at least on mapping one or more portions of the game text 212 to one or more event templates (e.g., each obtained over multiple messages, in multiple strings of text, and/or corresponding to multiple timestamps). In one or more embodiments, the event identifier 118 generates data representing and/or indicating an identified or detected event(s), which may be referred to as event data.

Event data for an event may comprise, by way of example and not limitation, data representing, indicating, or otherwise associated with the extracted parameter(s) 216, one or more portions of the game text 212, timestamps, an event identifier, one or more event template identifiers used to identify the event, and/or any other information that may be associated with an event. For example, the event data may include game information, game session identifiers, player information, or any of a number of other information. The generated event data may be organized and stored in one or more event files 220 and/or other a data structures. For example, the data structure(s) may be associated with a highlight generation system 300, in accordance with at least some embodiments of the present disclosure. In one or more embodiments, event data for one or more events may be stored in XML, JSON, txt, or any other file or storage format.

In one or more embodiments, the event identifier 118 assigns and/or associates a timestamp with one or more of the events, which may be included in event data. In one or more embodiments, the event identifier 118 uses the parser 116 to extract data corresponding to the timestamp(s) from the game text 212 and/or one or more other portions of the message(s) 208, such as the "ts" field. For example, the game text 212 is shown as including timestamps generated by the game instance 130, which may be used as or otherwise correspond to associated event timestamps. In one or more embodiments, a timestamp of an event may correspond to an order or time in which a message 208 used to identify an event is received or sent (e.g., e.g., based at least on a system time of a system, device, or component that received or sent the message 208).

Now referring to FIG. 3, FIG. 3 is an example system diagram of a highlight generation system 300, in accordance with at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The highlight generation system 300 may include, among other things, the client device(s) 102, the server(s) 104, and the network(s) 108. The highlight generation system 300 (and the components and/or features thereof) may be implemented using one or more computing devices, such as the computing device 900 of FIG. 9, described in more detail below.

The client device(s) 102 may include the display 110, the application(s) 114, an events plugin 310, the highlight generator 120, one or more other plugins 314, and one or more data store(s) 320. The server(s) 104 may include the game instance 130, the client interface 126, a game API 302, a video capturer 304, and/or one or more data store(s) 324.

The application(s) 114 (e.g., a client application of the server(s) 104) may operate as a facilitator for enabling gameplay of the game instance 130. For example, the application(s) 114 may, without limitation, display a game stream received via the network(s) 108 from the client interface 126. In some examples, as described herein, the application(s) 114 may include some of the features or functionality of the highlight generator 120, such as those related to generating highlights, recordings, or snapshots, for programming recording settings, etc. In addition, in some examples, the application(s) 114 may cause generation of the highlights, storage of the highlights, analysis of the game stream for determining when highlights should be generated, sharing of the highlights, etc. In some embodiments, the client device(s) 102 may include any number of application(s) 114 where features and functionality of the highlight generation system 300 are distributed.

In one or more embodiments, the client device(s) 102 includes the events plugin 310. The events plugin 310 may be configured to identify and extract event information from one or more messages associated with a game session. For example, the events plugin may include the parser 116 and/or the event identifier 118 of FIG. 1. The events plugin 310 may receive from the application 114 a message comprising at least one string of text (e.g., the message 208), transmitted over the network(s) 108, from then client interface 126 of the server(s) 104. In some embodiments, the events plugin 310 may additionally comprise the game data analyzer 122 of FIG. 1. In one or more embodiments at least some of the features or functionality of the events plugin 310 may be incorporated into the application(s) 114.

The other plugin(s) 314, may refer to any of a number of other plugins on the client device(s) 102. In one or more embodiments, the other plugins 314 may be used in place of, or in combination with, the events plugin 310. In one or more embodiments, the other plugins 314 may be configured to perform methods of detecting game events that are alternative to the NLP methods performed by the events plugin 310. For example, the events plugin 310 may be used to perform NLP to detect events in a game session, while the other plugin(s) 314 may simultaneously, or in parallel, perform OCR, computer vision, object detections, and/or non-NLP based techniques to detect events within that same game session. In one or more embodiments, the event identifier 118 may use the other plugin(s) 314 to detect and/or identify events. For example, the event identifier 118 may supplement NLP (e.g., and/or non-computer vision) event identification with non-NLP (e.g., and/or computer vision) methods and/or identify one or more events without NLP or without using the parser 116. In one or more embodiments the game data analyzer 112 may employ computer vision functionality to identify significant events from events identified by the event identifier 118.

While the events plugin 310 and the other plugins 314 are shown as being on the client device 102, in one or more embodiments, at least some of the features or functionality of one or more of those components may be implemented on the one or more servers 104 (e.g., the event identifier 118, the parser 116, the game data analyzer 112, computer vision event identification, etc.). Similarly, at least some of the features or functionality of the highlight generator 120 may be implemented on the server(s) 104.

In one or more embodiments, the server(s) 104 may render the game instance 130 of a game, and communicate the game stream of the game to the application(s) 114 over the client interface 126. The game API 302 may receive API calls from the game instance 130. In some examples, the game API 302 may facilitate communication between the game instance 130 and the client interface 126. In some embodiments, the game API may be included as part of a game interface, such as the game interface 128 of FIG. 1. The client interface 126 may interpret, translate, and/or pass API calls made by the game instance 130 to the game API 302 and provide corresponding messages to the application 114, such as the message 208. In one or more embodiments, the client interface 126 may use a real time streaming protocol (RTSP) to facilitate one or more of the communication between the application(s) 114 and the client interface 126 (e.g., the message(s) 208, a game stream, a highlight stream, etc.).

The video capturer 304 may comprise one or more components for capturing game video data. In at least one embodiment, the video capturer 304 may include at least some of the features or functionality of the render capture component 814 of FIG. 8. In one or more embodiments, the video capturer 304 may interpret requests to capture highlights of the game instance 130 on the server(s) 104. In one or more embodiments, a request from one or more client device(s) 102 may be received by the video capturer 304, instructing the video capturer 304 to record video data associated with a game highlight. For example, using the network(s) 108, the highlight generator 120 may request one or more frames of video data corresponding to a highlight occurring in a game session of the game instance 130. In one or more embodiments, a highlight may be based at least on one or more events identified using the event identifier 118 (e.g., timestamps and event parameters thereof). The video capturer 304, may identify and retrieve the one or more frames of video data from one or more data Store(s) 324. In one or more embodiments, the video capturer 304 may record data in the data store(s) 324 using the buffer 336 to record data, prior to receiving a request associated with generating a highlight. In one or more embodiments, the events plugin 310 may include at least some of the features and functionality of the video capturer 304. In such embodiments, the events plugin 310 may use the data store(s) 320 and/or a buffer 322 similar to how the video capturer 304 uses the data store(s) 324 and/or the buffer 336.

Figure 4:
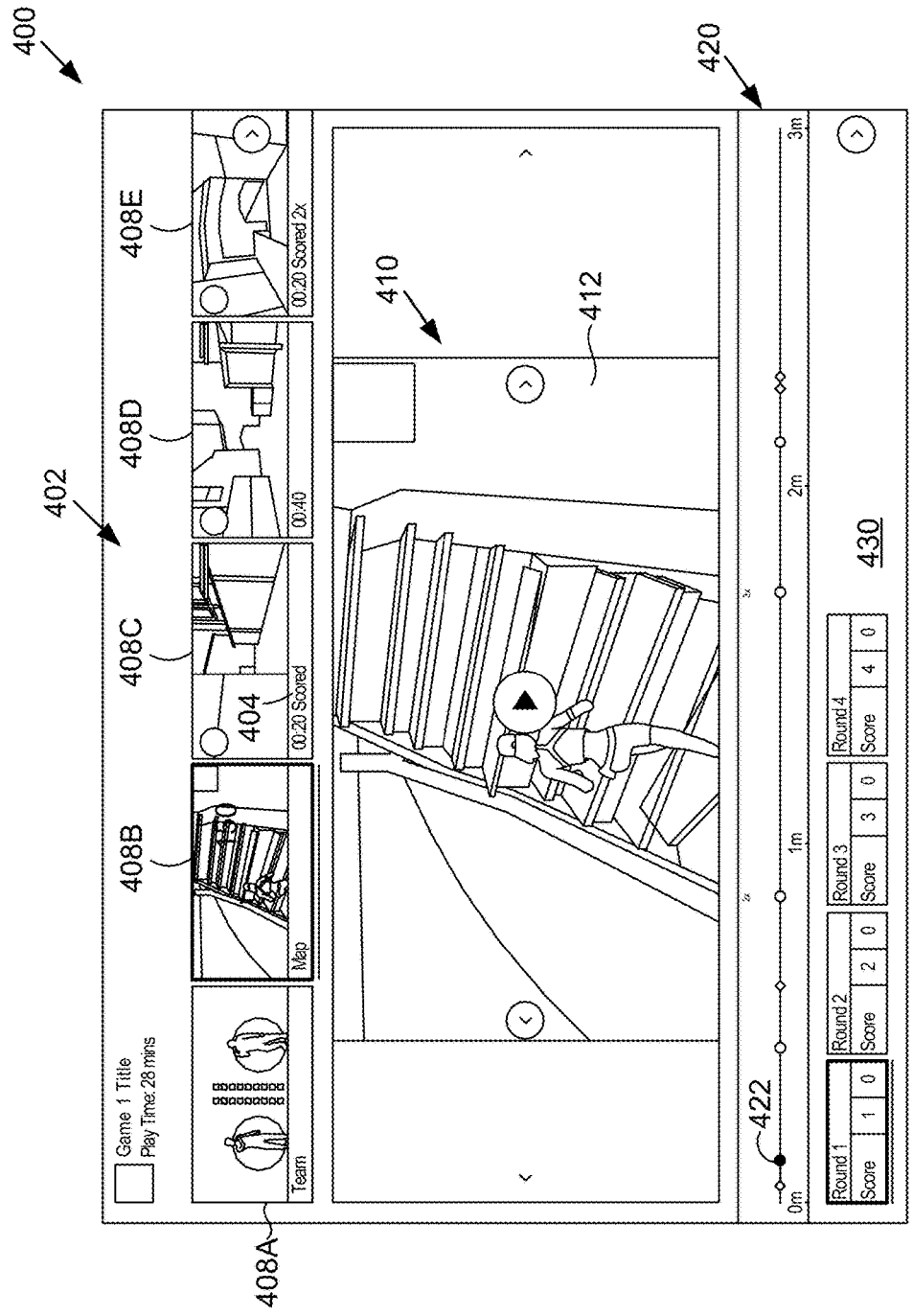
FIG. 4 is an example screenshot from a graphical user interface for generating, displaying, and/or recording game highlights, in accordance with at least some embodiments of the present disclosure.

Now referring to FIG. 4, FIG. 4 is an example screenshot from a graphical user interface 400 for generating, displaying, and/or recording game highlights, in accordance with at least some embodiments of the present disclosure. The graphical user interface 400 may include a highlight selection control region 402, a highlight label 404, a highlight replay region 410, a highlight timeline 420, and/or a highlight information display region 430. In some examples, the graphical user interface 400 may include controls for generating and recording gameplay highlight video data.

The highlight selection control region 402 may comprise an indication and associated controls associated with any of a number of highlights, such as highlights 408A, 408B, 408C, and 408E. The highlight selection control region 402 may display indications of highlights corresponding to one or more games and/or game sessions. In some examples, the highlight selection control region 402 may provide controls for the selection of one or more highlights to be displayed in other portions of the graphical user interface 400 such as the highlight replay region 410.

The highlight replay region 410 may display a highlight replay 412 that was generated from one or more events of a game session using the highlight generator 120. The highlight may be displayed in the highlight replay region 410 as an image, a video, or any of a number of other representations. The highlight replay region 410 may also comprise controls and selection elements for manipulating a highlight in the highlight replay region 410. For example, the controls may allow a user to start/pause the playback of a highlight video clip or change the playback speed or resolution of a highlight video.

The highlight timeline 420 may comprise an indication or graphic elements that represent events identified by the event identifier 118 and/or the game data analyzer 112 in a game session. The highlight timeline 420 may include highlight or event indications, such as a highlight indication 422 corresponding to the highlight active in the highlight replay region 410. In some examples, the highlight timeline 420 may comprise controls for selecting and displaying other highlights using the corresponding highlight indications.

The highlight information display region 430 may include graphic and textual elements that are associated with game highlights and/or corresponding events. For example, the highlight information display region 430 may provide elements that include information associated with a game session. For example, game scores or outcomes from a particular game session may be displayed. In one or more embodiments, the highlight information may correspond to one or more events, event types, parameter fields and/or values associated with or extracted from text by the event identifier 118. Similarly, the highlight label 404 and/or other information displayed in the graphical user interface 400 may correspond to one or more events, event types, parameter fields and/or values associated with or extracted from text by the event identifier 118. As an example, "scored" may be associated with an event type of an event used to generate the highlight 408C.

Figure 5:
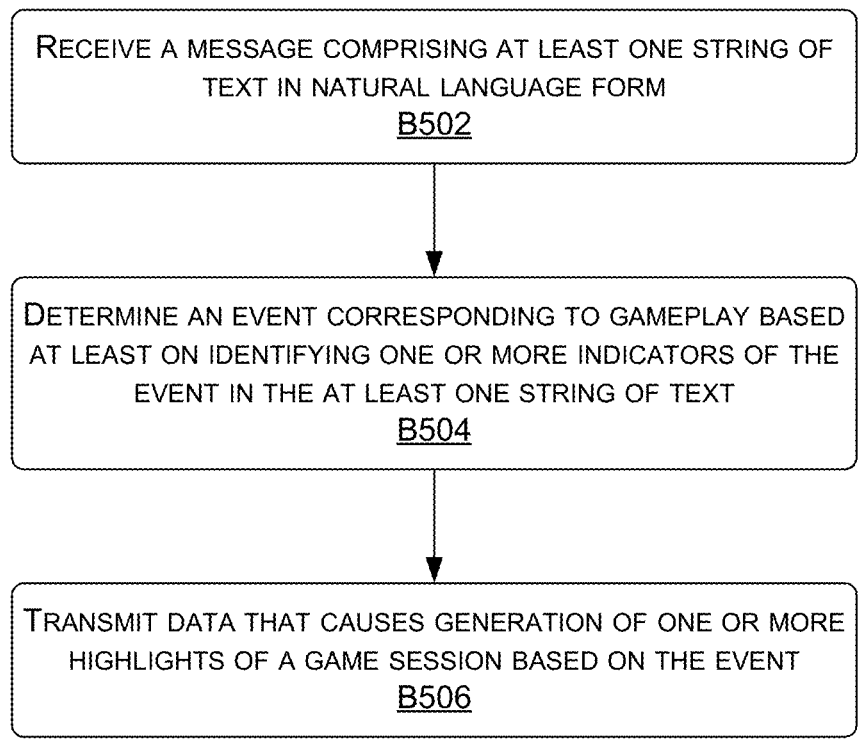
FIG. 5 is a flow diagram showing an example method for determining an event from at least one string of text in natural language form, in accordance with at least some embodiments of the present disclosure.

Now referring to FIG. 5, each block of method 500, and other methods described herein, comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the system 100 of FIG. 1. However, the methods may additionally or alternatively be executed by any one system, or any combination of systems, including, but not limited to, those described herein.

FIG. 5 is a flow diagram showing an example method for determining an event from at least one string of text in natural language-processed form, in accordance with at least some embodiments of the present disclosure. The method 500, at block B502, includes receiving a message comprising at least one string of text in natural language form. For example, the client device 102 may receive, via an API, the at least one message 208 comprising the natural language string(s) 210 in natural language form, wherein the natural language string(s) 210 may have been generated by the game instance 130 based at least on one or more conditions being satisfied in a game session, the one or more conditions corresponding to gameplay of the game.

The method 500, at block B504, includes determining an event corresponding to gameplay based at least on identifying one or more indicators of the event in the at least one string of text. For example, the event identifier 118 may determine an event corresponding to the gameplay based at least on identifying one or more indicators of the event in the at least one string of text using natural language processing.

The method 500, at block B506, includes transmitting data that causes generation of one or more highlights of a game session based at least on the event. For example, the event identifier 118 may transmit event data to the highlight generator 120 and/or the game data analyzer 122 to cause generation of one or more highlights of the game session based at least on the event.

FIG. 6 is a flow diagram showing an example method 600 for determining an event from at least one string of text using an event template, in accordance with at least some embodiments of the present disclosure. The method 600, at block B602, includes receiving at least one message comprising at least one string of text generated by a game based at least on one or more condition being satisfied in a game session. For example, the client device 102 may receive at least one message comprising at least one string of text generated by the game instance 130 of a game based at least on one or more conditions being satisfied in a game session, the one or more conditions corresponding to gameplay of the game.

The method 600, at block B604, includes mapping the at least one string of text to an event template. For example, the event identifier 118 may use the parser 116 to map the at least one string of text to an event template that defines one or more parameters of an event corresponding to the gameplay.

The method 600, at block B606, includes extracting one or more parameters from the string of text using the event template. For example, the event identifier 118 may extract the one or more parameters from the string of text using the event template.

The method 600, at block B608, includes transmitting data that causes a display in a user interface that is based at least on the one or more parameters of the event. For example, the highlight generator 120 may transmit data that causes a display in the graphical user interface 400 that is based at least on the one or more parameters of the event.

Figure 7:
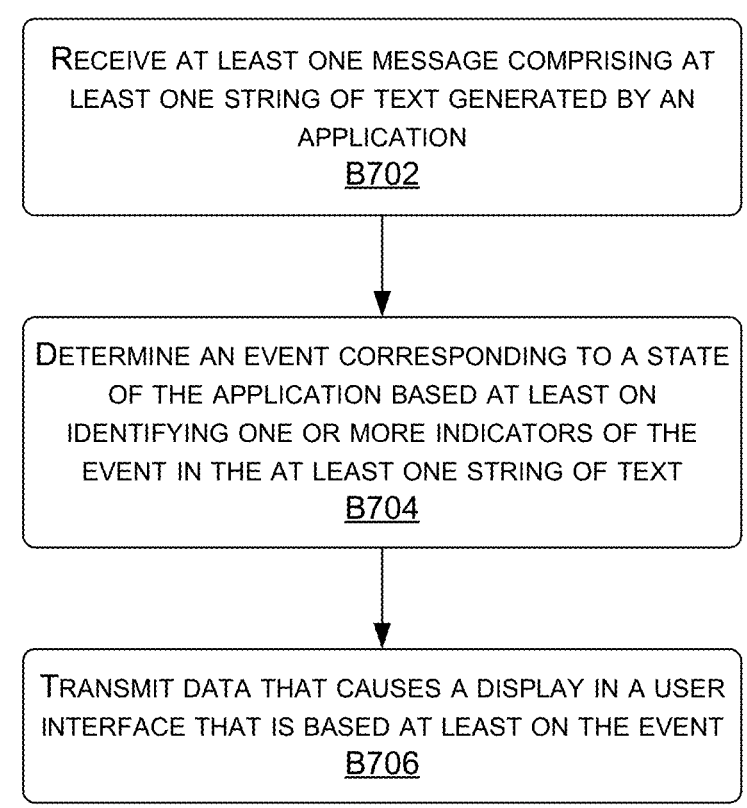
FIG. 7 is a flow diagram showing an example method for determining an event based at least on identifying one or more indicators in at least one string of text, in accordance with at least some embodiments of the present disclosure.

FIG. 7 is a flow diagram showing an example method 700 for determining an event based at least on identifying one or more indicators in at least one string of text, in accordance with at least some embodiments of the present disclosure. The method 700, at block B702, includes receiving at least one message comprising at least one string of text generated by an application. For example, the client device 102 may receive at least one message comprising at least one string of text, the at least one string of text generated by an application (e.g., the game instance 130) based at least on one or more conditions being satisfied in an application session, the one or more conditions corresponding to a state of the application.

The method 700, at block B704, includes determining an event corresponding to a state of the application based at least on identifying one or more indicators of the event in the at least one string of text. For example, the event identifier 118 may determine an event corresponding to the state of the application based at least on identifying one or more indicators of the event in the at least one string of text using natural language processing.

The method 700, at block B706, includes transmitting data that causes a display in a user interface that is based at least on the event. For example, the highlight generator 120 may transmit data that causes a display in the graphical user interface 400 that is based at least on the one or more parameters of the event.

Example Content Streaming System

Figure 8:
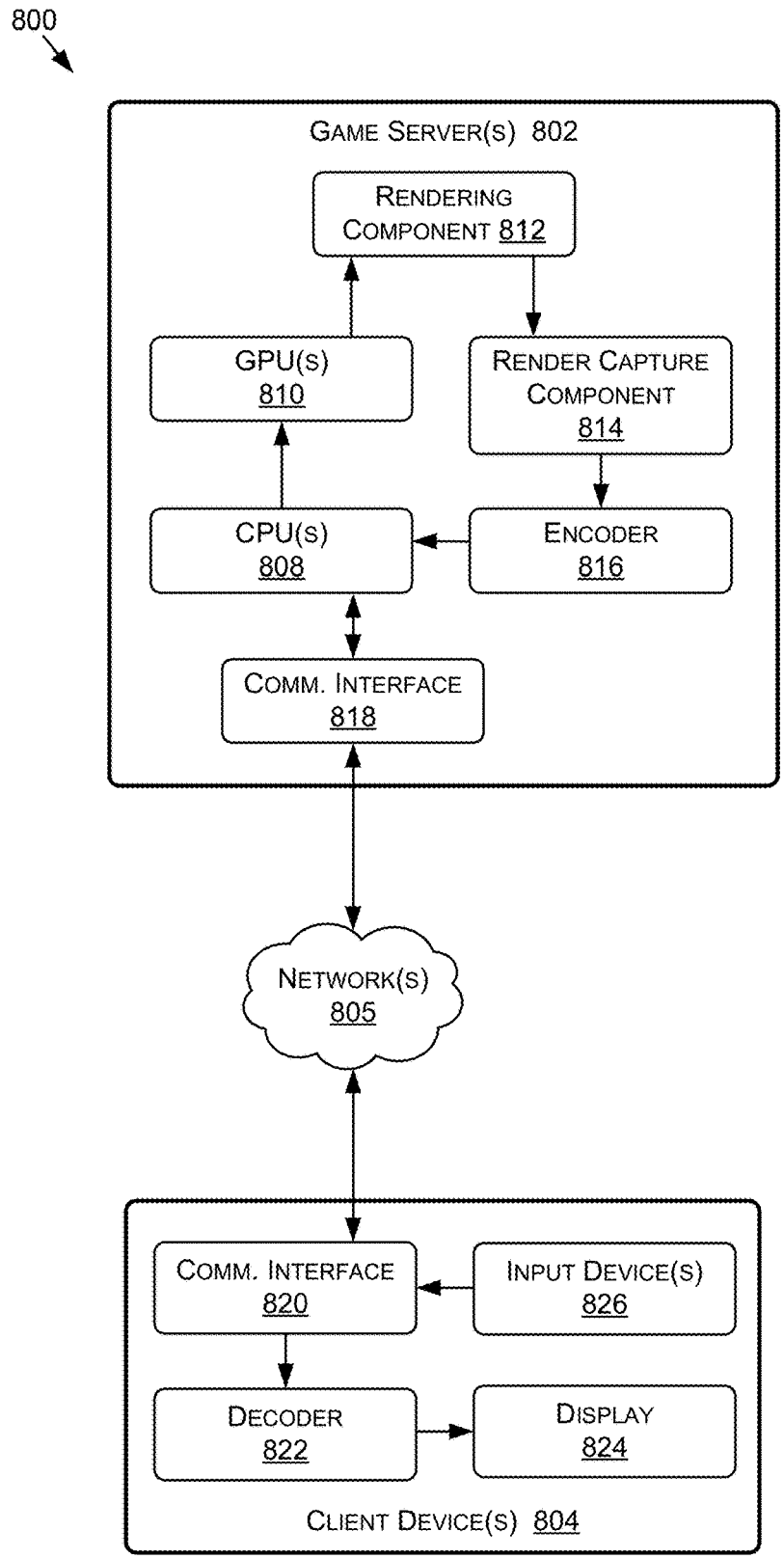
FIG. 8 is a block diagram of an example content streaming system suitable for use in implementing some embodiments of the present disclosure.

Now referring to FIG. 8, FIG. 8 is an example system diagram for a content streaming system 800, in accordance with at least some embodiments of the present disclosure. FIG. 8 includes application server(s) 802 (which may include similar components, features, and/or functionality to the example computing device 900 of FIG. 9), client device(s) 804 (which may include similar components, features, and/or functionality to the example computing device 900 of FIG. 9), and network(s) 806 (which may be similar to the network(s) described herein). In some embodiments of the present disclosure, the system 800 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering. In one or more embodiments, video provided by the client interface 126 may be of the application session (e.g., a game session), which may be streamed to one or more viewers and/or a player of the game. For example, the player may receive a stream of the game in a gaming application that presents the stream, whereas a viewer may receive the stream in a video player application that presents the game (e.g., within a web browser). In various examples, the application server(s) 802 may comprise one or more of the server(s) 104 or one or more of the server(s) 104 may be separate from the application server(s) 802.

For example, with respect to an instantiation of an application session, a client device 804 may be displaying a frame of the application session on the display 824 based at least on receiving the display data from the application server(s) 802. The client device 804 may receive an input to one of the input device(s) and generate input data in response. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some embodiments, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Example Computing Device

Figure 9:
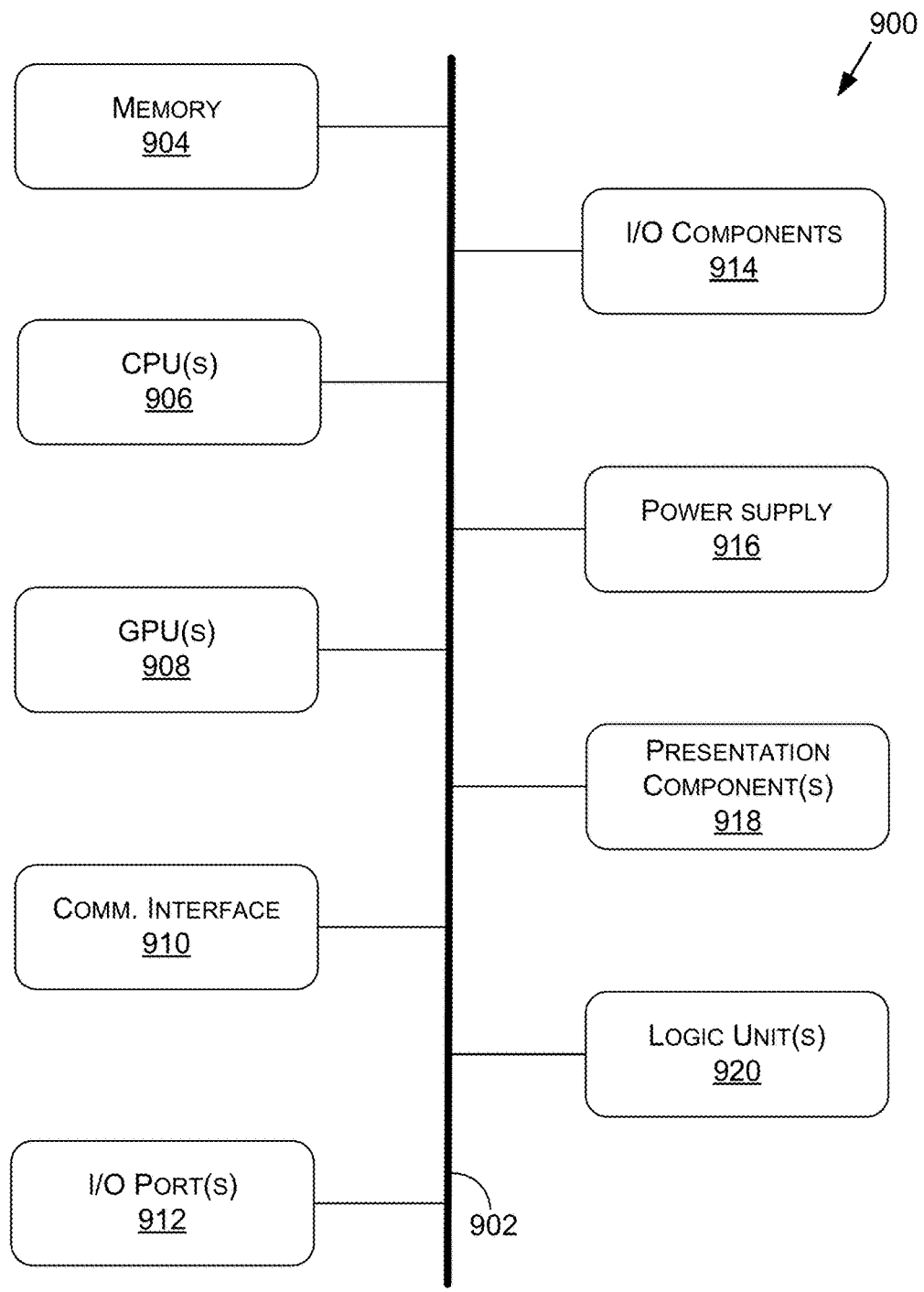
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 718, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
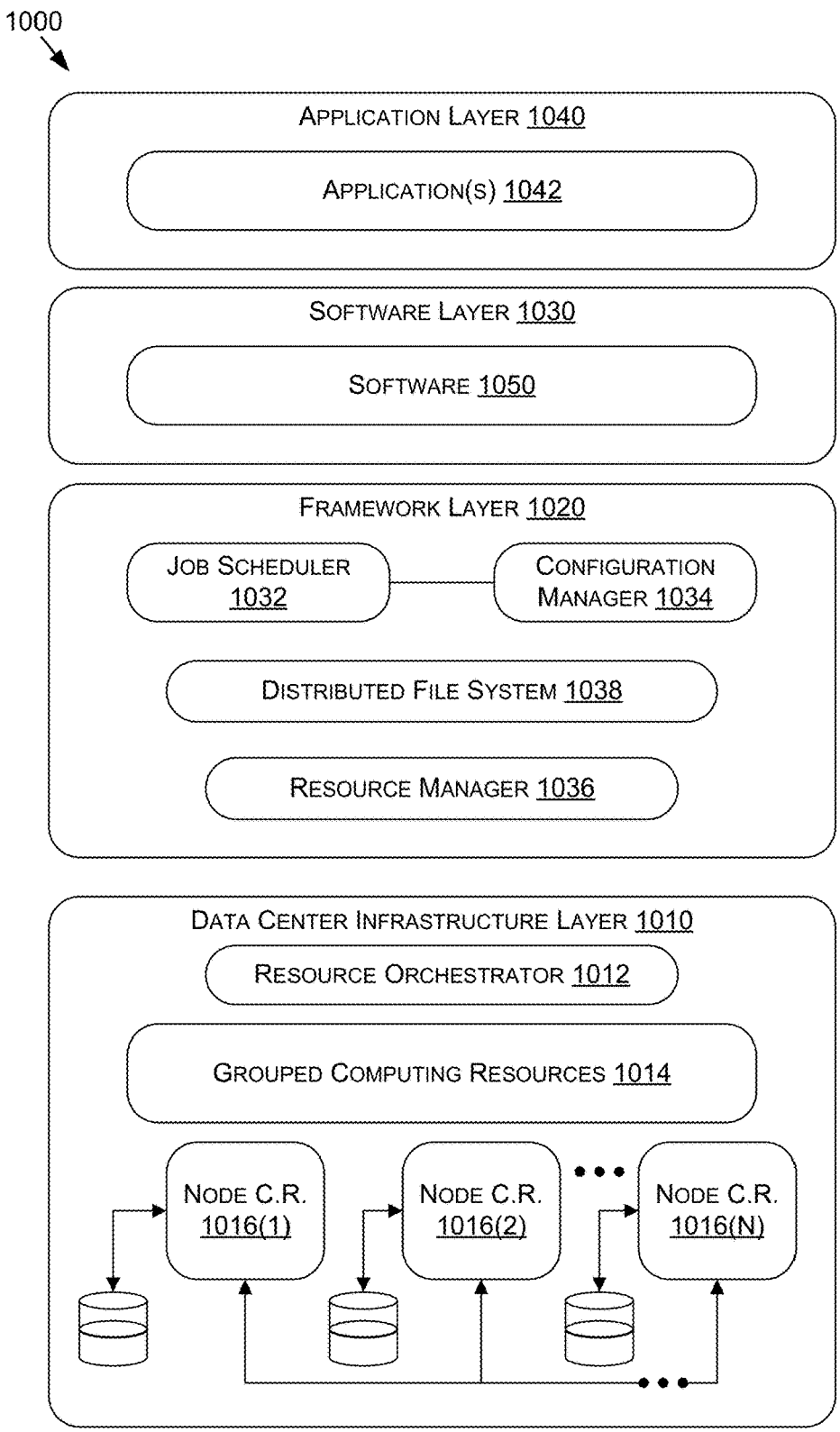
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1044 of software layer 1030 and/or one or more application(s) 1042 of application layer 1040. The software 1044 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1044 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based at least on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
    one or more processors to perform operations including:
        receiving, during a session of an application, at least one notification comprising at least one string of text produced by the application based at least on the application determining one or more conditions corresponding to application state of the session of the application are satisfied;
        determining an event corresponding to the session of the application based at least on identifying a presence of one or more indicators of the event in the at least one string of text using natural language processing; and
        transmitting data that causes generation of one or more curated portions of data from the session of the application based at least on the event.

2. The system of claim 1, wherein the at least one string of text corresponds to text of one or more log entries generated by the application based at least on the determining the one or more conditions are satisfied.

3. The system of claim 1, wherein the one or more indicators of the event include one or more action words that correspond to the application state.

4. The system of claim 1, wherein the one or more conditions include at least one condition for the application to present the at least one string of text during the session.

5. The system of claim 1, wherein the receiving the at least one notification is via an Application Programming Interface (API) corresponding to the application.

6. The system of claim 1, wherein the transmitting data that causes generation of one or more curated portions is responsive to the application determining at least one condition for a curated portion of data is met with respect to at least a portion of gameplay during the session of the application, the at least one condition being included in the one or more conditions.

7. The system of claim 1, wherein the operations further comprise the application presenting the at least one notification on a plurality of devices of a plurality of users of the session based at least on the application determining at least one condition of the one or more conditions is satisfied.

8. The system of claim 1, wherein the receiving of the at least one notification is by at least one cloud server that streams the session to at least one client device.

9. The system of claim 1, wherein the application includes at least one of a mobile application, a computer application, a console application, a web browser application, a gaming application, or a video streaming application.

10. The system of claim 1, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

11. A method comprising:
generating, during a session of an application, one or more notifications comprising at least one string of text corresponding to a state of the session of the application based at least on determining one or more conditions are satisfied in the state;
presenting the one or more notifications during the session;
transmitting at least one message comprising the at least one string of text, the transmitting causing:
an event corresponding to the session to be determined based at least on applying natural language processing to the at least one string of text, and
one or more curated portions of data from the session to be generated based at least on the event.

12. The method of claim 11, comprising generating one or more log entries corresponding to the at least one string of text based at least on the one or more conditions being satisfied in the state.

13. The method of claim 11, wherein the natural language processing determines the event based at least on identifying, in the at least one string of text, one or more action words that correspond to the state.

14. The method of claim 11, wherein the transmitting of the at least one message is via at least one Application Programming Interface (API) call.

15. The method of claim 11, wherein the transmitting of the at least one message is to at least one cloud server that streams the session to at least one client device.

16. The method of claim 11, wherein the application comprises at least one of a mobile application, a computer application, a console application, a web browser application, a gaming application, or a video streaming application.

17. At least one processor comprising:
processing circuitry to generate one or more curated portions of data from a session of an application based at least on an event determined from at least one string of text using natural language processing,
the at least one string of text produced by the application based at least on the application determining one or more conditions corresponding to application state of the session are satisfied and presented in one or more notifications based at least on the state.

18. The at least one processor of claim 17, wherein the at least one string of text corresponds to text of one or more log entries generated by the application based at least on the one or more conditions being satisfied in the application state.

19. The at least one processor of claim 17, wherein the event is determined based at least on one or more action words included in the at least one string of text, the one or more action words corresponding to the application state.

20. The at least one processor of claim 17, wherein the at least one processor is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

* * * * *